United States Patent [19]
Pimley

[11] Patent Number: 6,155,427
[45] Date of Patent: Dec. 5, 2000

[54] ZONED PRESSURE SCREEN

[75] Inventor: John J. Pimley, Gwent, United Kingdom

[73] Assignee: Thermo Black Clawson Inc., Middletown, Ohio

[21] Appl. No.: 09/308,196
[22] PCT Filed: Nov. 11, 1997
[86] PCT No.: PCT/US97/20274
  § 371 Date: May 14, 1999
  § 102(e) Date: May 14, 1999
[87] PCT Pub. No.: WO98/20958
  PCT Pub. Date: May 22, 1998

[30] Foreign Application Priority Data

Nov. 14, 1996 [GB] United Kingdom .................... 9623727

[51] Int. Cl.$^7$ ........................................................ B07B 1/22
[52] U.S. Cl. ........................... 209/270; 209/283; 209/305; 209/306; 209/273; 209/281
[58] Field of Search ..................... 209/273, 281, 209/283, 284, 293, 300, 305, 306, 270

[56] References Cited

U.S. PATENT DOCUMENTS

| | | |
|---|---|---|
| 2,750,855 | 6/1956 | Lathrop . |
| 3,145,165 | 8/1964 | Sandison . |
| 3,159,572 | 12/1964 | Ranhagen . |
| 3,363,759 | 1/1968 | Clarke-Pounder . |
| 3,400,820 | 9/1968 | Nelson . |
| 3,437,204 | 4/1969 | Clarke-Pounder . |
| 3,586,172 | 6/1971 | Young . |
| 3,680,696 | 8/1972 | Morin . |
| 4,127,479 | 11/1978 | Kurth et al. ............................. 209/306 |
| 4,166,028 | 8/1979 | Weber . |
| 4,188,286 | 2/1980 | Holz . |
| 4,202,761 | 5/1980 | Holz . |
| 4,234,417 | 11/1980 | Gauld et al. . |
| 4,306,975 | 12/1981 | Siewert . |
| 4,328,096 | 5/1982 | Chupka et al. . |
| 4,374,728 | 2/1983 | Gauld ..................................... 209/306 |
| 4,447,320 | 5/1984 | Lamort . |
| 4,462,901 | 7/1984 | Gauld . |
| 4,642,189 | 2/1987 | Hooper . |
| 4,744,894 | 5/1988 | Gauld ....................................... 20/306 |
| 4,851,111 | 7/1989 | Martin et al. . |
| 4,911,828 | 3/1990 | Musselmann et al. . |
| 4,915,822 | 4/1990 | Ljokkoi . |
| 5,119,953 | 6/1992 | Atkeison, III et al. . |
| 5,318,186 | 6/1994 | Rienecker . |

Primary Examiner—Donald P. Walsh
Assistant Examiner—Jonathan R Miller
Attorney, Agent, or Firm—Biebel & French

[57] ABSTRACT

Pressure screening apparatus for screening a suspension of papermaking stock employing an enclosing housing and a cylindrical screen, with a drum type rotor, has the screen divided or formed with axially spaced annular screening zones and a corresponding number of annular reject collection areas, one for each screening zone. The collection areas are positioned so as to receive rejects from one of the screening zones only, while a rotor is formed with outlet openings that apply stock suspension to selected ones of the screening zones so that there is no mixing of rejects between screening zones, and each screening zone receives stock suspension for screening independently of the other screening zones.

6 Claims, 3 Drawing Sheets

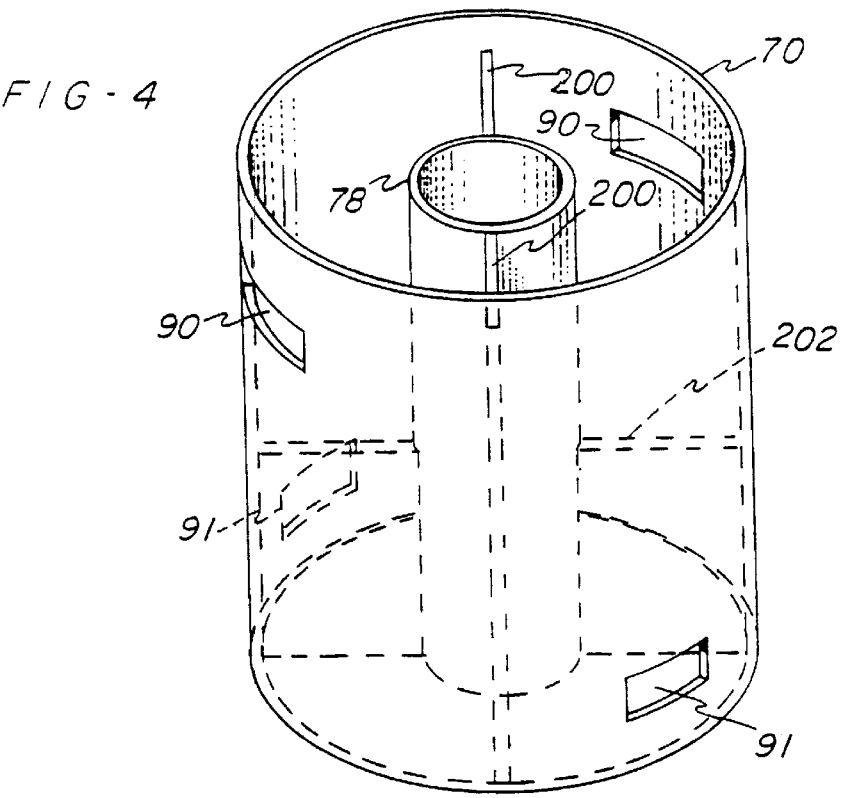
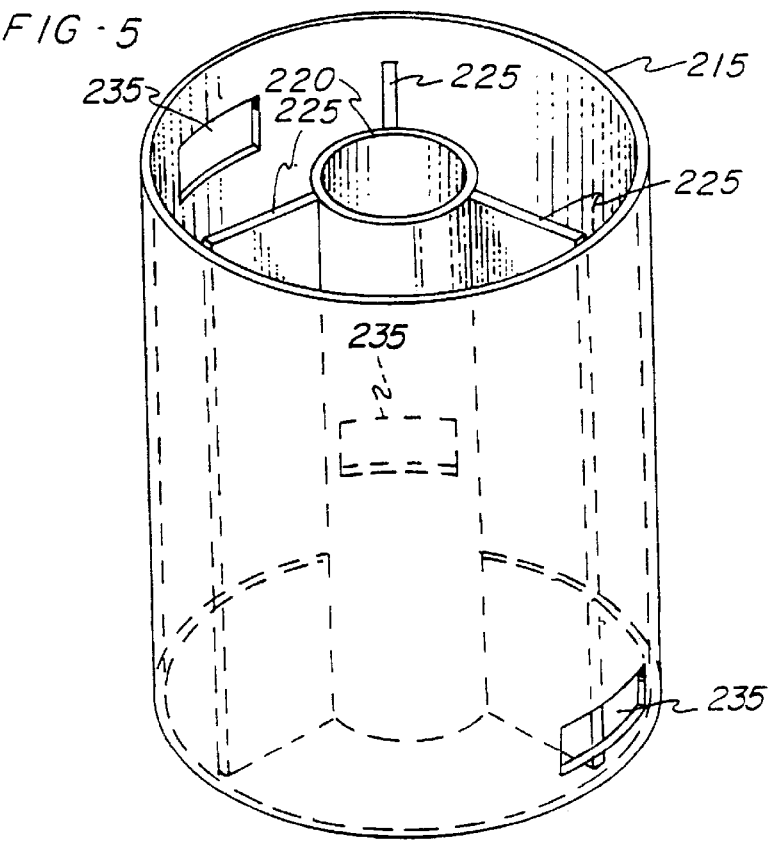

ZONED PRESSURE SCREEN

This invention relates to pressure screens and more particularly to a screen for removing contaminants from a suspension of paper making pulp.

Closed pressure screens in which a flat or cylindrical screen is used to separate a suspension of paper-making pulp into an accepts pulp fraction and a reject fraction have long been used for paper pulp cleaning. Such pressure screens commonly employ a generally cylindrical perforated screening member, which may form an aperture pattern made up of either holes or slots. A rotating impulse member is positioned to operate adjacent a surface of the screen, which is commonly, but not always, an inner inlet surface, to maintain the stock suspension in a state of agitation and to provide pressure impulses by which the screening function is aided. The rotating-member may comprise a drum-type rotor in which protuberances or foil-shaped sections are mounted on the outer surface and move adjacent to a screen surface, or foils may be mounted on generally radially extending arms for rotation adjacent the screen surface.

Commonly, the stock suspension to be screened is brought in at or adjacent an axial end of a cylindrical screen and, during screening, moves axially along the inlet surface, as stated above, commonly the inner surface of the screen cylinder. At the same time, a rejects fraction is created by the inhibiting or screening out of undesirable material which does not pass through the apertures or openings in the screen, and this undesirable material also moves axially along the screen surface until it reaches the end of the screen axially opposite the inlet end, where it is directed to a rejects accumulation chamber and to a rejects outlet. Examples of pressure screens made and operated according to this principle may be seen in the following patents which are assigned to the same assignee as this application: Chupka et al., U.S. Pat. No. 4,328,096 issued May 4, 1986, Martin et al., U.S. Pat. No. 4,851,111 issued Jul. 25, 1989, and Weber, U.S. Pat. No. 4,166,028 issued Aug. 28, 1979.

With the increase in the quantity of contaminants in waste paper, and the need to remove such unwanted material from a pulp furnish, it has become necessary to improve the efficiency of the pressure screen in order to remove more of the contaminants and unwanted material and to increase the capacity. Screening efficiency may be defined as the percentage of contaminant removed from the stream of the feed suspension by the screening operation.

Conventionally, the stock suspension enters at one end of the screen or enters at the center of the screen and flows in opposite directions over the screen. The multiple foils perform the well known impulse and screening function such that the fibers are accepted through the perforated or slotted screen while the larger or longer material which is unable to go through such perforations is retained within the screening zone. It is also known that such screens cause the stock consistency to increase between the feed end of the screening zone and the reject end of the zone while, at the same time, the contaminant concentration increases as it gathers and flows along the screen inlet surface toward the reject end.

Two principle factors reduce the ability of any screen to retain contaminants. These are: 1) higher velocity of stock through the screen apertures causes more of the contaminants to flow through the apertures; 2) higher concentrations of the contaminants within the screening zone increases the probability that contaminants will flow through the screen apertures.

The conventional screening apparatus has a gradient of velocity of the stock through the apertures over the length of the screening zone, this in an axial length in the case of a cylindrical screen. The highest velocity is at or adjacent the point of entry of the stock suspension into the screening zone where the consistency is the lowest and the contaminants concentration is also the lowest. On the other hand, the lowest stock velocity is at the reject end of the screening zone where the consistency is the highest, due to liquid removal through the screen, and at the same time the concentration of contaminants is at its highest level.

Center flow screens with top and bottom reject outlets reduce, but do not eliminate the problem. Rather, center flow screens conventionally and commonly permit the employment of axially longer or lengthened cylindrical screens, or two individual screens, one mounted above the other.

It is known that higher efficiency may theoretically be maintained by reducing the axial extent of the screening zones and thus creating a plurality of separate screening zones, and then removing the contaminant fraction associated with each zone. This is the approach suggested in Ljokkoi, U.S. Pat. No. 4,915,822 issued Apr. 10, 1990. In patent '822, it is suggested that concentric screens may be divided into a plurality of axially separate screening zones and the contaminants may be removed through an elaborate arrangement of conduits formed in or as part of a drum-type rotor. It is believed, due to the complexity, that the arrangements suggested in '822 have not been commercialized by reason of the technical difficulty of employing concentric screens, as shown, with hollow rotor foils therebetween forming conduits for the contaminants.

There is accordingly a need for optimizing the performance of relatively conventional screen cylinders using relatively conventional impulse inducing rotor apparatus to control contaminant build up and consistency increase so that a greater portion of the screen surface is continually operated at or near its most efficient condition.

In the realization of this invention, a screen means, which may be a single screen or a plurality of separate screens, is divided into a plurality of axially spaced screening bands or zones, and means are provided for applying the stock suspension under pressure directly to the inlet side of the screening surface, at each such zones. Such axially disposed zones individually form a minor portion of the total axial extent of the screening means.

At least one rejects receiving or collection area is provided for each such zone. Preferably a rejects collection region is provided at one axial end of each zone, so that each zone is terminated at one end at a rejects collection region. At least one such region or collection area is located between a pair of axially spaced screening zones. The total effective axial height or length of any screening zone is reduced by dividing the effective screening length into a plurality of individual screening zones of more limited length, in which the adverse effects of the increase in contaminant concentration and in consistency are reduced, and in which the through the screening zone put velocity is maintained constant over the axial length of the usual high peak velocity adjacent to the stock entry is eliminated.

The individual screening zones or bands have outlet sides or surfaces which open into individual or common accepts collection areas leading to an accepts outlet. The rejects collection areas associated with each of the zones, likewise may be connected to a common rejects outlet, or to individual reject outlets.

In one preferred embodiment of the invention, a cylindrically continuous screen member is employed in which a plurality of discrete screening zones are established or defined by the position of annular rings carried on the outer surface of a drum-type rotor, so that one zone is separated from the other. In this preferred embodiment, the inlet suspension is directed into the rotor interior and exits through openings formed in the rotor surface in immediate proximity to a screening zone. One or more rejects accumulation regions or areas are defined in the screen, positioned axially between screening zones, into which screen-rejected material may flow. Means are provided, by way of openings through the screen wall, by which the reject material is extracted from the rejects accumulation areas.

In another preferred embodiment, two or more generally cylindrical screens are mounted in axially spaced relation and held together by bolts and spacers. An intervening axial space between the screens forms a rejects collection annulus for one of the screens. In either embodiment, the rotor may be internally configured with internal baffles to form discrete flow passages leading to each of the screening zones.

The invention may be described as a pressure screen for screening a suspension of paper-making stock having an enclosing housing with screen cylinder means in the housing, with an inlet surface and an outlet surface. A rotor is mounted for rotation within the screen means and has pressure impulse members or foils mounted for rotation with the rotor, in close proximity to the screen inlet surface. A stock inlet in the housing directs a stock suspension to be screened into the interior of the screen means. A stock outlet in the housing receives screened fibers passing through the screen means, and a reject outlet receives reject material from the inlet surface. The improvement comprises or is characterized by the fact that the screen means is formed with at least two axially spaced screening zones, and at least one rejects collection area is positioned between the screening zones, and in which the inlet surface of one of the screening zones communicates with the rejects collection area for delivering rejects from the collection zone to a rejects outlet. In the case of a pair of cylindrical screen sections or individual screens, one above the other, the screen zone closer to the inlet may feed the intermediate rejects collection area while the screen zone positioned more remote from the inlet may feed into a conventional rejects collection area at its remote end.

In another aspect of the invention, the invention may be described as a pressure screen for screening a suspension of paper making stock, as outlined above, in which a drum-type rotor is mounted for rotation within the screen and in which the stock inlet in the housing directs the stock suspension into the interior of the rotor. Such pressure screen is characterized by a plurality of axially spaced annular zones including at least two axially spaced screening zones and at least one intermediate rejects collection zone or area. The zones are defined by discrete ribs between the screen and the rotor whereby stock to be screened is directed into the annular screening zones. Openings are formed in the rotor to coincide with the screening zones for delivering stock to be screened from the inlet directly into the screening zones. A rejects collection passage is formed in the screen leading from the reject area and communicating with a rejects outlet, with a result that screening is restricted to the plurality of screening zones in which a reject area is positioned intermediate the screening zones.

It is accordingly an important object of this invention to provide an improved and more efficient pressure screen for screening a suspension of paper making stock, in which a screen is formed by or divided into a plurality of discreet screening zones with at least one rejects collection area being positioned between a pair of such screening zones.

A further object of the invention is the provision of an improved drum-type pressure screen for screening a suspension of paper making stock in which a cylindrical screen is formed or forms a plurality of screening zones and in which a drum rotor is provided with outlet openings for delivering a stock suspension to be screened directly into one of the discrete screening zones.

Another object is the provision of a pressure screen, as outlined above, in which a screen cylinder has formed thereon two or more annular screening zones and axially separated by a reject collection area positioned between a pair of screening zones.

In order that the present invention may be more readily understood, reference will now be made to the accompanying drawings, in which:

FIG. 4 is a perspective illustration of the shell of a drum-type rotor including internal walls or partitions for the division of incoming stock suspension, for a two-zone pressure screen; and FIG. 5 is a view similar to FIG. 4 showing the shell of a drum-type rotor with internal walls for the division of incoming flow for a three-zone screen according to this invention.

Figure 1:
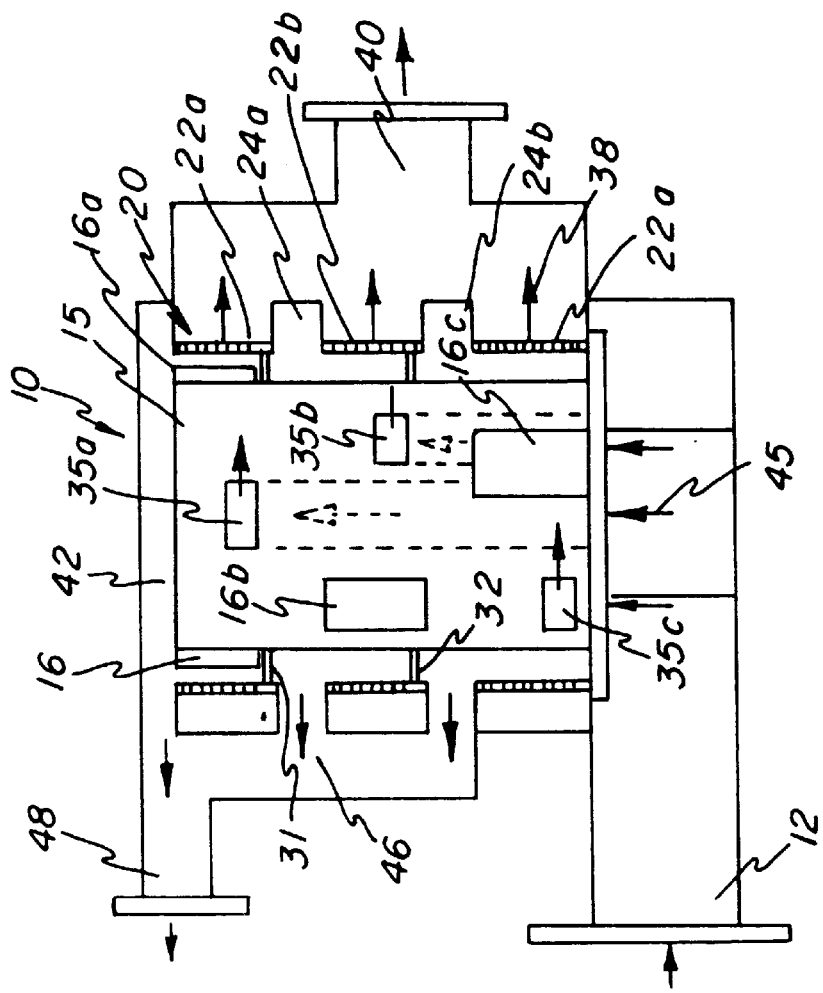
FIG. 1 is a sectional and partially diagrammatic view of a zoned pressure screen in accordance with one embodiment of this invention.

Referring to the figures of the drawing, which illustrate preferred embodiments of the invention, a pressure screen is illustrated generally at 10 in FIG. 1 as having an inlet 12 for a suspension of papermaking pulp to be screened. The pulp to be screened is brought into the interior shell of a closed top drum-type rotor 15, having external impulse foils 16 on the outer surface. The rotor 15 is enclosed within the housing of the pressure screen, and coacts with cylinder screen means in the housing, shown at 20 in FIGS. 1 and 2.

The screen means is an integrated screen cylinder 20 and is divided into a plurality of axially spaced annular screening zones 22. In this instance, three such zones are shown including an upper zone 22a, a central zone 22b, and a lower zone 22c. The screen cylinder portions in the zones 22 are formed with conventional screen openings such as in the form of holes or slots.

The drum rotor individual foils 16 are positioned to move in close proximity to the inner inlet surface of the screen 20 at each of the zones 22a, 22b and 22c. The foils 16 are designated by the reference numeral 16a, 16b and 16c corresponding to the zone at which they operate. The angular positions of the foils 16 in each of the zones are staggered with respect to the positions of the foils in the other zones, to provide a balanced operation.

The screen 20 is ribbed to define a pair of intermediate rejects collection areas positioned between a pair of axially spaced annular screening zones. Thus, the screen 20 has an annular rejects collection area 24a which is positioned axially between screening zones 22a and 22b, and has a second annular rejects collection area 24b which is positioned between annular screening zones 22b and 22c. These rejects collection areas are defined by radially outwardly extending ribs on the surface of the screen 20. Thus the area 24a is defined by ribs 26 and 27 while the zone 24b is defined by ribs 28 and 29.

The wall of screen 20 is formed with arcuately extending rejects outlet openings 30 formed in each of the rejects areas 24. The purpose of the openings 30 is to permit the rejects, which are collected on the inner surface of the screen, to pass radially outwardly into the respective areas 24a or 24b.

The rotor 15 is also provided with a pair of annular ribs 31 and 32 which extend radially into close coaction with the inside screening surfaces of screening zones 22a and 22b, at the axial bottom of such zones respectively, for isolating the rejects collection zone area 24a from the zone 22a, and for isolating the rejects collection area 24b from the zone 22b.

The drum rotor 15 is provided with outlets in its cylindrical shell for directing the stock suspension to be screened against the screen in the zones 22a, 22b and 22c. This includes outlets 35a that are axially aligned with and open at the screen zone 22a, outlets 35b aligned with the screening zone 22b, and outlets 35c aligned with the screening zone 22c.

The accepts flow through the respective screening zones in the direction of the arrow 38 into a common accepts outlet 40. The rejects from the collection areas 24a and 24b, and the rejects which flow into the space 42 above the rotor from the zone 20a, are collected by a common rejects manifold 46 to a rejects outlet 48. The pressure screen of FIGS. 1–2 thus has a rejects collection area for each of the three screening zones, so that rejects which collect on the inside screen surface are promptly removed in a collection area, before a build-up of rejects can occur to impede the optimum operation of the screen.

Figure 2:
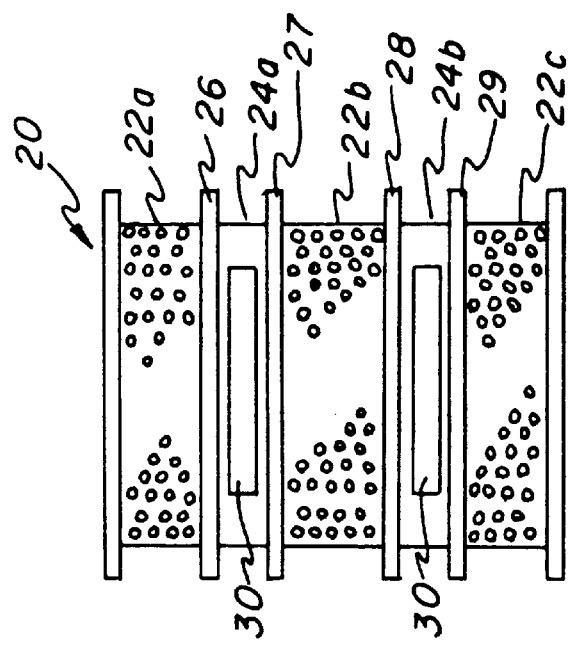
FIG. 2 is a side view of the cylindrical screen for use in the pressure screen of FIG. 1.

In the operation of the embodiment of the pressure screen, as shown in FIGS. 1 and 2, a stock suspension is applied under pressure to the inlet 12 for flowing upwardly in the direction of the arrows 45 into the interior of the closed top drum rotor. The suspension exits the interior of the drum rotor 15 through the openings 35 that are positioned to direct the stock into one of the annular screening zones for coaction by one of the sets of foils 16.

The stock which exits the bottom openings 36c are directed against the lower most zone 22c, and rejects travel upwardly along the inside rejects surface of the cylinder 20 until they reach the lowermost opening 30 and escape into the annular rejects collection area 24b. The rib 32 prevents these rejects from mixing with or traveling into the reject surface of the intermediate screen zone 22b.

In a like manner, the rejects which are collected on the inside surface of the screen at the intermediate zone 22b travel upwardly until they reach the outlet 30 positioned between the ribs 26 and 27, at which point these rejects may escape into the rejects collection area 24a for collection to the rejects outlet 48. The rotor rib 31 prevents these rejects from mixing or contaminating the rejects which are accumulating at the uppermost screening zone 20a.

The rejects from the upper zone 20a travel upwardly until they escape into the enclosed housing 42, for collection with the rejects from the intermediate areas 24a and 24b, to the rejects outlet 48. The ribs 26, 27, 28 and 29 of the screen 20 separate the accepts sides of the respective zones from the intermediate rejects collection areas.

By dividing the screen cylinder 20 into a plurality of screening zones, with one or more intermediate rejects collection zones, the extent to which the rejects must move along the inner inlet surface of the screen sections is reduced and therefore the contamination build-up and consistency build-up is reduced, permitting the screen sections at the respective zones to operate at optimum efficiency.

Figure 3:
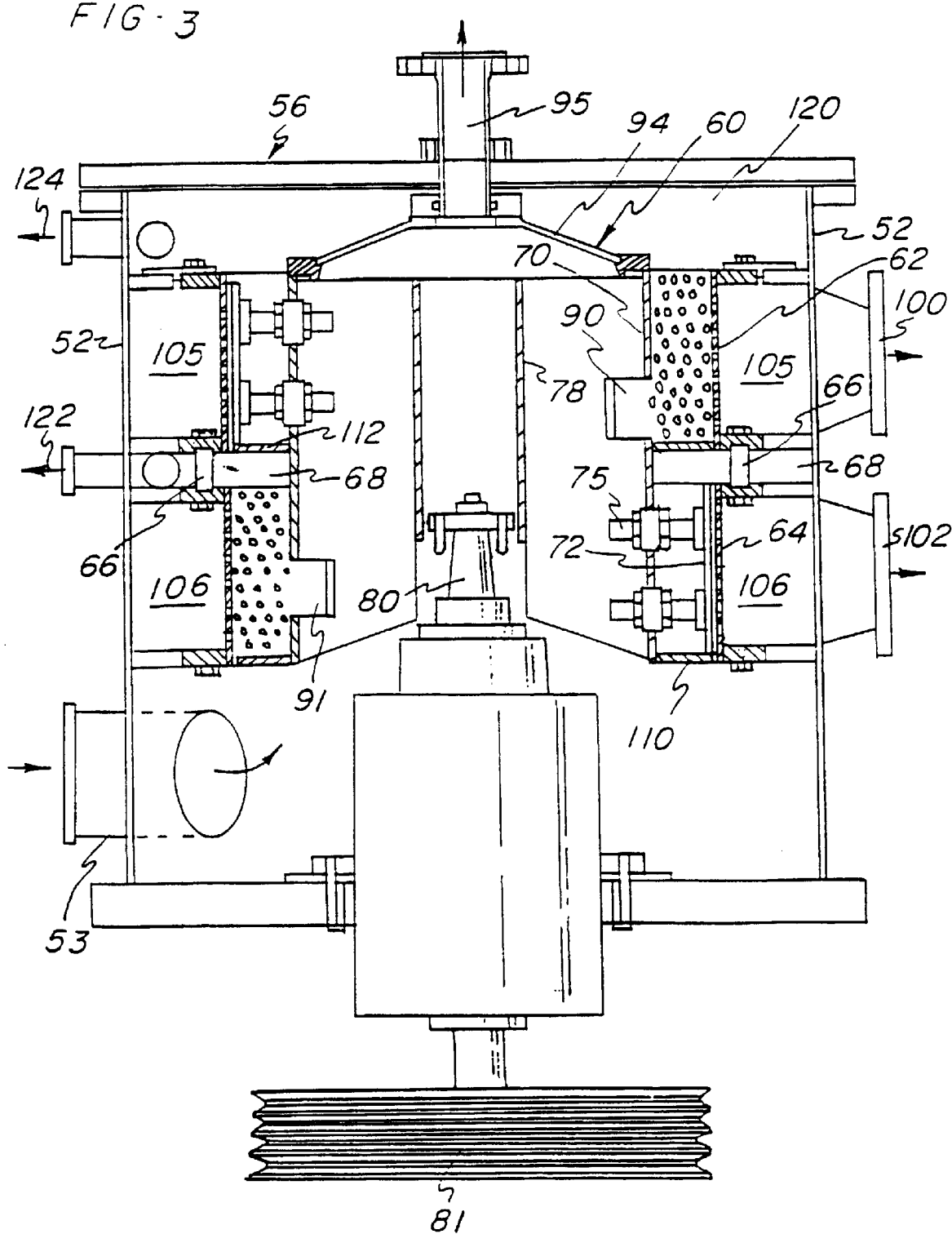
FIG. 3 is a view, partially in section, of a further embodiment of a zoned pressure screen in accordance with this invention.

The closed pressure screen 50 shown in FIG. 3 illustrates a further embodiment of the invention. A housing 52 has an inlet 53 for stock suspension, the stock suspension is carried upwardly within a domed drum-type rotor 60. The screen means in this embodiment comprises a pair of individual identical annular screens 62 and 64 stacked one above the other and defining corresponding axially spaced screening zones. The upper screen 62 is separated from the lower screen 64 by a series of vertical bolts and spacers 66 and which define therebetween an annular rejects collection area or chamber 68.

The rotor 60 is shown as having a shell or wall 70 on which are mounted individual foils 72 on radially extending arms 75 attached to the wall 70. The rotor is formed with an inner concentric tube 78 which is mounted on a spindle 80 for rotation by a belt about the pulley 81. The wall 70 is provided with stock feed openings 90 and 91 through which the stock suspension is fed respectively to the zones represented by the screens 62 and 64.

The upper end of the rotor 60 is closed by a domed cap or cover 94 which is open at the center to discharge into a lightweight reject outlet 95, in which lightweight rejects may be separated from the suspension before screening. Outlets 100 and 102 in the housing 50 open into the accepts chambers 105 and 106, respectively for the cylinders screens 62 and 64.

The rotor shell or wall 70 further supports radially extending ribs which define and isolate the screening chambers from each other, including lower rib 110 and an intermediate rib 112. The intermediate rib 112 separates and isolates the annular rejects collection chamber 68 from the screening zone defined by the upper screen 62. The lower rib 110 closes off the screening zone of the lower screen from the feed from inlet 53.

The space above the rotor dome 94 forms a further rejects chamber 120. The rejects collection chamber 68 is provided with a rejects outlet 122 while the chamber 120 is provided with a rejects outlet 124.

In the operation of the screen as illustrated in FIG. 3, a suspension of papermaking stock to be screened is brought up through the inlet 53 into the interior of the rotor 60, and the lightweight contaminants may be removed through the top outlet 95. The drum wall openings 90 and 91 direct the stock suspension into one or the other of the screening zones defined by the screens, to be acted upon by the respective foils 72.

Rejects which collect on the inside or inner reject surface of the lower screen 64 move upwardly until they clear the top of the screen 64 at which point they move outwardly around the spacer studs 66 into the annular collection chamber 68, for discharge through the outlet 122. The rejects which accumulate on the upper screen 62 are carried upwardly into the upper rejects chamber 120 for discharge through the outlet 124.

The operation of the pressure screens according to this invention may be rendered even more efficient by providing the rotor 15 or 60 with rotor shells in accordance with the illustrations of FIGS. 4 or 5. FIG. 4 shows the drum shell 70 of FIG. 3 particularly adapted for delivering the stock suspension into two axially spaced apart screening zones and providing for a division of stock flow through the shell 70 to the respective top outlet 90 and bottom outlet 91. It will be understood that the shell is shown, for the sake of clarity, without the impulse foils 72 and arms 75 attached, and with the cover 94 removed.

The interior of the drum shell 70 is divided into quadrants by two pairs of generally radially extending vanes including a first set of vanes 200 which extend from the internal support tube 78 to the inside wall of the shell throughout the substantial length of the height of the shell. A second pair of radially extending walls 202 are positioned in orthogonal relation to the walls 100 and extend approximately one-half the height of the wall 70. The result is that there is provided, for the passage of the stock suspension, a quadrant of interior space between one of the walls 200 and one of the walls 202 within which is positioned one of the top or bottom stock suspension outlets. In this manner, an even flow of stock suspension is assured for each of the stock outlets 90,91 formed in the rotor shell. At the same time, the vanes formed by the walls 200 and 202 impart a rotational movement to the stock suspension within the shell thereby enhancing centrifugal separation of lightweight contaminants which will flow upwardly into the domed top 94 and through the central lightweight contaminant outlet 95.

The rotor embodiment illustrated in FIG. 5 is one which is particularly designed for a pressure screen which has three pressure screening zones, such as that illustrated for the screen in FIGS. 1 and 2 above. The rotor shell 215, which may have a closed top or which may be domed for extraction of lightweight contaminants, as illustrated in FIG. 3, is provided with a central support core 220 from which are mounted three equally spaced radial ribs or walls 225 defining three arcuate spaces within the interior of the shells 15, one each including one of the outlets 235 corresponding to a separate screening zone. The ribs or walls 225 also provide the primary function of structural support for the shell 70 of the drum-type rotor. Also, it will be understood that the rotor, at its outer surface, will carry foils either directly on the surface or on arms 75, as previously described. Again, this rotor construction assures a more uniform distribution of the stock suspension to each of the rotor shell outlets which are positioned in proximity to one of three screening zones for efficient delivery of the stock suspension to one of the three screening zones.

The invention accordingly provides a pressure screen in which contaminant concentration is reduced below that experienced in conventional screens. The separate feeding of the screening zones which is accomplished by this invention, and the provision for each screening zone of its own reject zone, reduces the maximum slot or perforation velocities below that found in conventional screens which have one, or at most, two reject zones. The screening efficiency therefore, across the surface of the screening zones, is improved by the lowering of the maximum velocity of the stock through the openings, whether they be perforations or slots, and by making the velocities more even at the same time, the concentration of contaminants is reduced, thereby making it less probable that contaminants will flow through the screened openings to the accepts side.

The screen operation may be further optimized by accurately controlling the flow of the stock suspension to each of the screening zones, which may be effected by controlling the relative sizes of the discharge openings formed in the rotor shell at the respective zones. Also, while the invention is described in terms of embodiments which are bottom fed, it will be apparent to those skilled in the art that the invention is equally applicable to a top fed screen.

What is claimed is:

1. In a pressure screening apparatus for screening a suspension of papermaking stock having an enclosing housing, a cylindrical screen in said housing having an inlet surface and an outlet surface, a drum-type rotor mounted for rotation within said screen and having a hollow interior, said rotor having pressure impulse foils mounted thereon for rotation with said rotor in close proximity to said inlet surface, a stock inlet in said housing directing a stock suspension to be screened into the hollow interior of said rotor, a stock outlet in said housing for receiving screened fibers passing through said screen, a rejects outlet in said housing for receiving reject material from said inlet surface of said screen, the improvement comprising said screen being formed with at least two axially-spaced apart annular screening zones, said housing with said screen forming two annular rejects collection areas, one for each of said screening zones, one of said rejects collection areas positioned in the space between said screening zones and arranged to receive rejects from one of said annular screening zones, and the other of said rejects collection areas being positioned at an axial end of said screen and arranged to receive rejects from the other of said annular screening zones, said rotor having formed thereon at least two stock suspension outlet openings positioned respectively to apply such suspension to the inlet surfaces of one each of said annular screening zones, and said rejects collection areas opening to said rejects outlet.

2. A pressure screening apparatus according to claim 1 in which said drum-type rotor is formed with a generally cylindrical shell, and radial walls in said shell dividing said shell interior into separate flow passages for directing such stock suspension into discrete ones of the said stock suspension outlet openings.

3. A pressure screening apparatus according to claim 1 in which said cylindrical screen comprises a pair of cylindrical screen sections mounted in axially aligned spaced apart relation and each of said screen sections forming one of said annular screening zones, and in which said one rejects collection area is formed in the axial space between said screen sections.

4. A pressure screening apparatus in accordance with claim 1 in which said axially spaced-apart annular screening zones are defined by circumferential ribs formed on said drum-type rotor guiding said stock suspension from said suspension outlet openings into coaction with said screen inlet surface at said screening zones.

5. A pressure screening apparatus according to claim 4 in which said cylindrical screen is formed with an opening positioned axially between said annular screening zones and communicating with said one rejects collection area for passage of rejects to said rejects outlet.

6. A pressure screening apparatus according to claim 1 in which some of said rotor suspension outlet openings are arcuately and axially spaced from other of said rotor outlet openings, and in which said rotor is formed with radially extending walls therein forming axial flow passages for such stock suspension, said flow passages leading to discrete ones of said outlet openings for providing a uniformity of the flow of stock suspension from said inlet to said screening zones.

* * * * *